United States Patent [19]

Schumacher et al.

[11] Patent Number: 5,024,595

[45] Date of Patent: Jun. 18, 1991

[54] FURNACE PROTECTIVE DEVICE

[75] Inventors: David B. Schumacher, St. Louis; Steven J. Bakowski, Richmond Heights, both of Mo.

[73] Assignee: Snyder General Corporation, Red Bud, Ill.

[21] Appl. No.: 361,429

[22] Filed: Jun. 5, 1989

[51] Int. Cl.⁵ .............................................. F23N 1/00
[52] U.S. Cl. .................................. 431/18; 126/99 R; 126/110 R; 126/116 A
[58] Field of Search .............................. 431/18, 19, 65; 126/99 R, 110 R, 116 A, 116 R; 122/504; 165/13, 913

[56] References Cited

U.S. PATENT DOCUMENTS 4,682,579 7/1987 Bigham .......................... 126/116 A
4,729,328 3/1988 Shellenberger .................. 126/110 R

FOREIGN PATENT DOCUMENTS 146928 11/1981 Japan ..................................... 431/18
31727 2/1982 Japan ..................................... 431/18

OTHER PUBLICATIONS

Goellner, Allen R., "Electrical Probe Level Indicator Comes of Age", Combustion, Jun. 1963; pp. 35-38.

Primary Examiner—James C. Yeung
Attorney, Agent, or Firm—Rogers, Howell & Haferkamp

[57] ABSTRACT

A burner control for a condensing furnace having a flame proving circuit that incorporates the flame at the burner to be closed and that opens upon absence of a flame to cause a gas valve to close and block the flow of gas to the burner. A short circuit shunting the flame proving circuit includes a probe that projects into the outlet manifold of the condensing furnace. If liquid level in the outlet manifold reaches the probe, a short circuit is closed between the probe and a ground on the manifold. The control to the valve is energized to close the valve in the same manner as if the flame had extinguished at the burner. Upon closing the gas valve, the burner is extinguished.

4 Claims, 1 Drawing Sheet

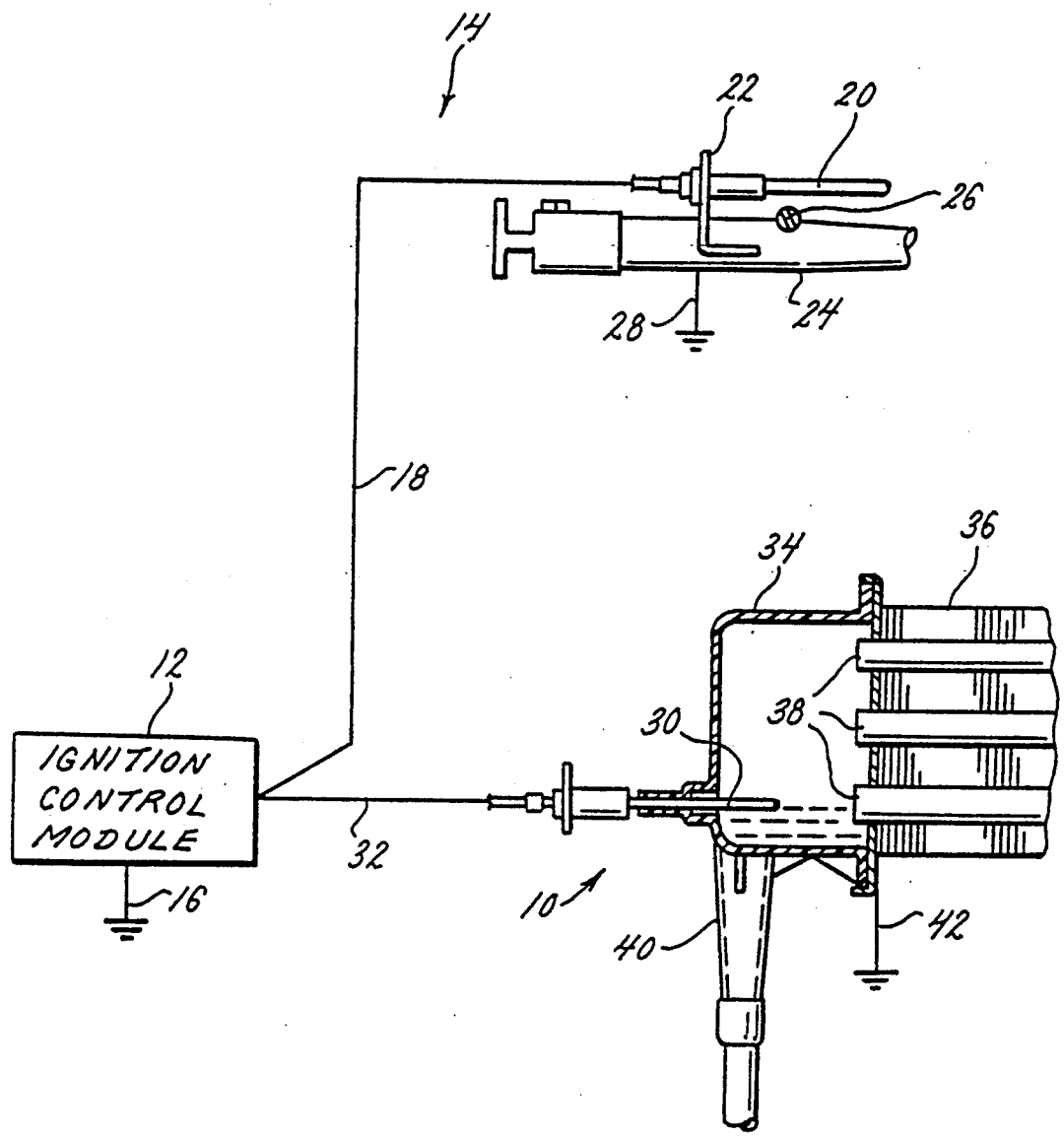

5,024,595

FURNACE PROTECTIVE DEVICE

BACKGROUND OF THE INVENTION

The present invention relates to a furnace protective device for a condensing furnace to terminate the operation of a burner when there is an abnormal accumulation of condensate in the secondary heat exchanger. Particularly, the invention relates to a burner protective device for a heating system having a primary heat exchanger and a secondary heat exchanger connected in series. A burner burns a gas-air mixture and the resulting products of combustion flow through the primary heat exchanger and then through the secondary heat exchanger.

The combustion products generally remain gaseous in the primary heat exchanger. However, the cold room air contacting the walls of the secondary heat exchanger produce condensation of the combustion products, releasing latent heat of vaporization that transfers additional heat to the room air. This condensate flows with the remaining combustion gases from the secondary heat exchanger tubes to an outlet manifold. The gases escape through a flue. See, for example, U.S. Pat. Nos. 4,738,307 and 4,729,328.

The condensate normally flows from a secondary heat exchanger through an outlet that is piped to a suitable drain. If condensate backs up in the secondary heat exchanger for any reason, such as from a blockage of the condensate drain, the liquid may build up in the secondary heat exchanger to a level that will reduce combustion air flow and affect the combustion quality to the point that carbon monoxide will be produced.

The present invention provides a protection device to turn off the gas to the burner when the level of the condensate in the secondary heat exchanger rises to an abnormal level. This protective device is connected to an ignition control module. The control module includes a D.C. circuit that is closed by the presence of a flame at the burner and that opens when the flame is extinguished. A relay circuit to a gas valve is deactivated by the ignition control module to close the gas valve when extinguishment of the flame opens the circuit through the burner.

In the conventional mechanism, a pressure switch is connected in the thermostat circuit in series with the ignition control module. The pressure switch is positioned to respond to (negative) pressure in the condenser outlet manifold produced by an induction blower. If the condensate level rises to an abnormal level, the pressure switch will open the thermostat circuit to the ignition control module, shutting down the system, which closes the gas valve.

This conventional mechanism has several drawbacks. Primarily, the pressure switch is too sensitive and sometimes reads pressure signals falsely and shuts down the system. Different sized furnaces require different settings of the pressure switch. It is relatively costly, both in materials and installation. Overall, it is relatively expensive.

SUMMARY OF THE INVENTION

For this furnace protective device, there is a principal flame rectification circuit (as is conventional) that closes or opens in response to the presence or absence of flame at a burner. This circuit includes the flame of the burner, so if the flame goes out for an abnormal reason, the circuit is opened. There is an ignition control module that deenergizes the gas valve control relay in response to interruption of the flame rectification circuit when the flame goes out (also as is conventional).

According to the present invention, a probe projects into the outlet manifold of the secondary heat exchanger. The probe is wired in parallel with the flame rectification circuit of the control module. If liquid rises in the outlet manifold and contacts the probe, the probe becomes grounded. This probe circuit acts as a shunt circuit that can short out the flame circuit. Thus, the shunting circuit will, upon the presence of enough liquid, close in parallel with the main flame circuit, thereby shorting the flame rectification circuit. With no current in the flame rectification circuit, the ignition control module responds as if the flame had been extinguished, and causes the gas valve to close.

BRIEF DESCRIPTION OF THE DRAWING

The drawing consists of a diagrammatic representation of the furnace protective device.

DESCRIPTION OF PREFERRED EMBODIMENT

This furnace protective device 10 is connected to an ignition control module 12 that includes a flame proving circuit 14. The ignition control module 12 may be, for example, a White Rodgers 50E47-140 type control which is a primary safety ignition control. It is connected with an AC source (not shown). The module is grounded at and delivers DC voltage on wire 18 of the flame proving circuit 14 leading to a flame sensor electrode 20.

The flame sensor electrode is supported by a bracket 22 that straddles and is welded to a burner 24 that is one of a row of burners. A zip tube 26 extends across the tops of the burners. When the burners are lit, the upshooting flame engulfs the flame sensor electrode 20.

The burner 24 is grounded at 28 to complete the flame proving circuit from the ignition control ground 16 through the wire 18 to the flame sensor electrode 20, and if a flame is present, thence through the ionized gases created during the combustion process, to the ground at 28, and back through the ground 16 to close the loop.

The flow of current in this flame proving circuit proves the presence of flame. If the flame goes out, the circuit is broken. Through a relay circuit (not shown) the ignition control module 12 responds to close a gas valve (not shown), which results in cutting off the flow of gas to the burner 24.

The furnace protective device 10 has a conductive probe 30 connected by a wire 32 to the flame rectification circuit of the ignition control module 12. The conductive probe 30 is mounted in the manifold casing 34 of a secondary or condensing heat exchanger 36 that has a plurality of tubes 38 in which the combustion products are at least partially condensed. The conductive probe 30 is insulated from the grounded secondary heat exchanger. There is a drain 40 in the bottom of the manifold 34 that normally allows condensate to drain from the manifold 34.

The conductive probe 30 is located at a level within the manifold 34 that represents the maximum level of condensate accumulation. There is a ground 42 for the manifold 34 that completes a circuit to the ground 16 of the ignition control module 12.

Thus, if condensate in the manifold 34 reaches the level of the probe 30, a shunt circuit is established from the ignition control module 12 through the wire 32, the probe 30, the condensate, to the ground 42.

OPERATION

The operation of the device is as follows.

In the normal arrangement, the flame sensor electrode 20 is mounted above the burner 24 by the bracket 22. The electrode 20 is electrically insulated from the burner except when a flame is present. If flame is present, the potential between the electrode 20 and the grounded burner 24 will cause current to flow through the flame, then to ground at 28, thence to ground at 16 on the ignition control module 12, and back through the wire 18 to close the loop through the rectifying flame proving circuit. If the flame is extinguished for any reason, the circuit is broken, and the ignition control module 12 has a relay circuit (not shown) that will close a valve and cut off the supply of gas to the burner.

The purpose of the condensing heat exchanger 36 is to take as much heat as possible from the flue gases before they are exhausted. The latter operation through the condensing heat exchanger normally involved reduction of the temperature of the flue gases to levels below their dew point. Consequently, the latent heat of vaporization from the flue gases is applied to the heating of the air. Thereafter, the flue gases thus cooled and condensed can be exhausted. The condensate can usually be carried off by the drain pipe 40. However, if for some reason the drain pipe 40 becomes clogged or stopped up, the condensate will collect in the manifold 34.

If the condensate level rises to connect the probe 30 electrically with the ground 42, the short circuit will be energized, shunting out the burner flame proving circuit 14. Because of this short circuit, no current flows through the flame proving circuit 14, and the ignition control module 12 responds as if there were no flame, to close the gas valve.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a burner control for a condensing furnace, a first circuit adapted to sense the presence of a burner flame and a second circuit to shunt out said first circuit, the second circuit being responsive to the buildup of condensate within the condensing furnace in response to the operation of the first circuit and its rendering operative of the burner, the second circuit comprising a shunt circuit for the first circuit when the condensate buildup reaches a certain point in the condensing furnace, which shunt circuit can render the first circuit inoperative thereby to stop the burner operation, the condensing furnace has an outlet manifold where condensate can collect, a drain opening from the manifold, and wherein the second circuit includes electrical contacts that are closed by the presence of a predetermined liquid level in the manifold due to clogging of the drain.

2. The burner control of claim 1 wherein one of the contacts is a probe set at a selected level within the manifold and the other contact is a ground connection from the manifold.

3. In a condensing furnace having a condensing heat exchanger and a burner for causing combustion products to flow to the condensing heat exchanger to be condensed therein by colder ambient air flowing over said condensing heat exchanger, and having means normally to conduct away such condensate from the condensing heat exchanger, a flame-responsive device having an electrode spaced from the burner adapted to supply potential between itself and the burner, the presence of flame at the burner adapted to supply a current path for current flow through the flame from the electrode to the burner, the control having valve mechanism to stop the flow of gas to the burner when the flame is extinguished;

a furnace protective device including a shunt circuit, the shunt circuit including a probe connected into the condensing heat exchanger, insulated therefrom but spaced to be contacted by the condensate upon rise of the condensate to a predetermined level within the said condensing heat exchanger, thereby completing a short circuit through the condensate such than when the condensate reaches the probe, the shunt circuit will be energized and will cause the valve mechanism to stop the flow of gas to the burner.

4. The furnace protective device of claim 3 wherein the furnace has a primary heat exchanger in series with the secondary heat exchanger and the burner is positioned to cause combustion products to flow through the primary heat exchanger and thence through the secondary heat exchanger.

* * * * *